United States Patent [19]

Schimmel et al.

[11] Patent Number: 5,585,427
[45] Date of Patent: Dec. 17, 1996

[54] PIGMENT DISPERSING ADDITIVE FOR COATING COMPOSITIONS

[75] Inventors: Karl F. Schimmel, Allegheny County; James A. Claar, Butler County; Lori S. Rardon, Allegheny County, all of Pa.; Mary L. Kimbro, Cuyahoga County, Ohio

[73] Assignee: PPG Industries, Inc., Pittsburgh, Pa.

[21] Appl. No.: 335,287

[22] Filed: Nov. 7, 1994

[51] Int. Cl.$^6$ ............... C08K 5/06; C08K 3/08; C08F 12/18; C08G 63/00
[52] U.S. Cl. ............ 524/377; 524/441; 524/502; 526/251; 526/296; 526/310; 526/320; 528/271
[58] Field of Search ............ 528/271; 526/296, 526/251, 310, 320; 524/377, 441, 502

[56] References Cited

U.S. PATENT DOCUMENTS

| | | | |
|---|---|---|---|
| 2,914,509 | 11/1959 | Woodruff | 528/271 |
| 3,483,169 | 12/1969 | Case et al. | 528/271 |
| 5,130,369 | 7/1992 | Hughes et al. | 524/846 |

FOREIGN PATENT DOCUMENTS

| | | |
|---|---|---|
| 2079228 | 11/1971 | France. |
| 1178700 | 1/1970 | United Kingdom. |

OTHER PUBLICATIONS

Chemical Abstracts, vol. 119 (1993) No. 4, 26 Jul. 1993, Columbus, OH U.S. Abstract No. 28822, 'Hydrophilic Unsaturated Diester Polymers With Transparency and Heat Resistance', p. 16.

*Primary Examiner*—Kriellion S. Morgan
*Attorney, Agent, or Firm*—Linda Pingitore; Dennis G. Millman

[57] ABSTRACT

A copolymer with an acid value less than one contains alternating units of a vinyl monomer and a diester of a dicarboxylic acid wherein at least one of the esterifying groups contains a polyether group. The copolymer is particularly useful in preparing pigment dispersions for coating compositions. Such compositions exhibit properties including reduced pigment settling and improved metallic flake orientation, flow and leveling.

38 Claims, No Drawings

5,585,427

PIGMENT DISPERSING ADDITIVE FOR COATING COMPOSITIONS

BACKGROUND OF THE INVENTION

The present invention relates to pigment dispersing additives for use in pigment dispersions of coating compositions.

Pigments used to impart colors to coating compositions are typically added in the form of dispersions. It is important to stabilize these dispersions so that the pigment particles remain suspended in the dispersion medium rather than settling. When settling occurs, the pigments can form a solid flocculated mass that is often difficult to resuspend.

Often, it is desirable to use metallic or metallic-effect pigments. These so-called "flake" pigments are comprised of particles that are denser or larger than other pigment particles; as such, they tend to settle more quickly. Coating compositions containing metallic and metallic-effect pigments are commonly used in automotive original equipment manufacture and refinish applications. They are usually spray-applied at a relatively low viscosity to obtain a glossy, lustrous appearance with a smooth surface and good distinctness of image. They are usually also supplied at relatively low viscosities, to avoid the need for extensive adjustment of viscosity prior to use.

Typically, settling is more severe and occurs more quickly as viscosity drops. Thus, settling of pigments is a common problem when metallic pigment dispersions are added to low-viscosity spray-applied coating compositions.

The settling properties of a pigment dispersion or a coating composition to which the pigment dispersion is added can be modified by using certain pigment dispersing additives that work by modifying the rheology of the coating composition. Typically, these pigment dispersing additives increase low-shear viscosity by producing a secondary structure. For example, one class of pigment dispersing additives works by forming hydrogen bonds that are easily disrupted under high-shear conditions, such as when a coating composition is spray-applied. Thus, anti-settling properties are improved without sacrificing application properties such as flow, leveling, or metallic flake orientation.

Another class of pigment dispersing additives, the "associative" thickeners, work by forming hydrophobic micelles in an aqueous environment. Similarly, inorganic particulate materials such as magnesium silicate clays, hectorite clays or fumed silicas work by forming hydrogen bonds in either an aqueous or a non-aqueous environment. Pigment dispersing additives comprising organic polymeric materials such as waxes, castor oil derivatives, polyurethanes, or carboxylated acrylics that work by a hydrogen-bonding mechanism have also been described, and these can be made suitable for use in either an aqueous or a non-aqueous environment. For a pertinent review, see "Pigment Stabilization Through Mixed Associative Thickener Interaction," by David J. Lundberg and J. Edward Glass, Journal of Coatings Technology, Vol. 64 No. 807, April, 1992.

Finally, U.S. Pat. No. 5,168,105 describes a three-package coating composition comprising, in part, a non-aqueous metallic pigment package that includes a theological additive. The rheological additive disclosed is an acid functional acrylic polymer prepared by conventional vinyl addition polymerization yielding a random structure.

Rheological additives which exhibit good wetting properties as well as good stability when mixed with pigments such as aluminum flake or titanium dioxide are, therefore, desirable.

SUMMARY OF THE INVENTION

In accordance with the present invention, there is provided a copolymer comprising alternating units of a vinyl monomer and a diester of a dicarboxylic acid in which at least one of the esterifying groups comprises a polyether group; said copolymer having an acid value of less than one.

A pigment dispersion containing the copolymer described above as well as a coating composition formulated with the dispersion are also provided.

DETAILED DESCRIPTION

The copolymer of the present invention is particularly advantageous as a pigment dispersing additive for preparing pigment dispersions. The pigment dispersions are useful in formulating a variety of coating compositions, but are especially useful in formulating aqueous based coating compositions.

The claimed copolymer comprises alternating units of a vinyl monomer and a diester of a dicarboxylic acid in which at least one of the esterifying groups comprises a polyether group. Preferably the copolymer also comprises units of a diester of a dicarboxylic acid in which the esterifying groups are organic groups free of polyether groups. This is more particularly described below. The copolymer has a theoretical acid value of less than one; preferably, the theoretical acid value is essentially zero. Calculations yielding theoretical acid value are well understood by those skilled in the art of polymer synthesis and will not be discussed in detail here.

The copolymer of the present invention generally has a number-average molecular weight of from about 1,000 to about 100,000, preferably from about 20,000 to about 50,000, more preferably from about 25,000 to about 40,000 as measured by gel permeation chromatography using polystyrene as a standard.

The vinyl monomer component is chosen such that it is capable of producing an alternating copolymer with a diester of a dicarboxylic acid. Typically, the vinyl monomer component is selected from the group consisting of vinyl aromatic compounds, substituted vinyl aromatic compounds, vinyl ethers, allyl compounds, alpha olefins, dienes, and mixtures thereof. The preferred vinyl monomer component comprises a vinyl aromatic species, most preferably styrene.

Alternatively, the vinyl monomer component comprises alpha-substituted vinyl aromatic compounds. Preferably, these are substituted styrene compounds represented by Structure I, shown below:

Structure I

Substituted Styrene Compounds Suitable for the Present Invention

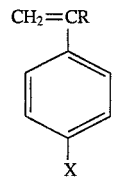

Wherein: R=H or $CH_3$; and X=H, $CH_3$, $CH(CH_3)_2$, $OCH_3$, $N(CH_3)_2$, Cl, Br, I, F, CN, or $NO_2$ or R=H and X=$CH_2Cl$, $CH_2Br$ or $N(CH_3)_2$ Specific examples include vinyl toluene, alpha-methylstyrene, p-isopropyl-alpha-methylstyrene, p-isopropylstyrene, p-methoxy-alpha-methylstyrene, p-methoxystyrene, p-chloro-alpha-methylstyrene, p-chlorostyrene, p-fluoro-alpha-methylstyrene, p-fluorostyrene, p-dimethylamino-alpha-methylstyrene, p-dimethylaminostyrene, and the like.

Beta-substituted styrene compounds such as stilbene can also be used. Additionally, beta-substituted styrene compounds represented by Structures II and III, shown below, can be used.

Structure II

Beta-Substituted Styrene Compounds Suitable for the Present Invention

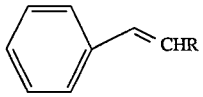

Wherein: $R=C_6H_6$, $CH_3$, $CO_2CH_3$, Cl, $COCH_3$, or $XC_nH_{2n+1}$, with X=O or S and n=1–6 (both cis and trans isomers)

Specific examples of materials represented by Structure II include beta-methylstyrene, beta-chlorostyrene, beta-methoxymethylstyrene, beta-methoxystyrene, beta-n-butoxystyrene, beta-isobutoxystyrene, beta-tert-butoxystyrene, and the like.

Structure III

Beta-Substituted Styrene Compounds Suitable for the Present Invention

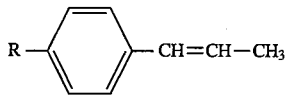

Wherein: $R=CH_3O$, $CH_3$, H or Cl

Specific examples of materials represented by Structure III include p-methoxy-beta-methylstyrene, p-methyl-(beta-methylstyrene), p-chloro-beta-methylstyrene, and the like.

Vinyl ethers represented by Structure IV, shown below, can be used for the vinyl monomer component.

Structure IV

Vinyl Ether Compounds Suitable for the Present Invention $ROCH_2=CH_2$

Wherein: R=alkyl, aryl or cycloaliphatic group with a carbon chain length of 1 to about 20

Specific examples of suitable vinyl ethers include alkyl vinyl ethers such as methyl, ethyl, isopropyl, 2-ethylhexyl, n-butyl, isobutyl, tert-butyl, 2-chloroethyl, benzyl vinyl ethers, and mixtures thereof.

Also suitable are aryl vinyl ethers including methyl propenyl ether (both cis and trans isomers), phenyl vinyl ether, and mixtures thereof. Additionally, 2-phenylvinyl alkyl ethers or thioethers having a carbon chain length not exceeding about 6 wherein the alkyl group can be either straight-chain or branched can be used. These materials are represented by Structure V, shown below:

Structure V

2-Phenylvinyl Alkyl Ethers and Thioethers Suitable for the Present Invention

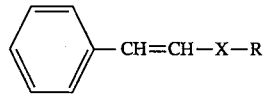

Wherein: X=O or S; and $R=C_nH_{2n+1}$; and n=1–6

Suitable cycloaliphatic vinyl ethers include cyclopentyl and cyclohexyl vinyl ethers, and mixtures thereof. Additional examples of suitable vinyl ether monomers include divinyl ether, 1,2-dimethoxyethyelene, p-dioxene, and conjugated dihydroanisole, and mixtures thereof.

Allyl compounds represented by Structure VI, shown below can be used for the vinyl monomer component.

Structure VI

Allyl Compounds Suitable for the Present Invention $CH_2=CH-CH_2-R$

Wherein: R=alkyl, aryl or olefin group with a carbon chain length of 1 to about 20 or R=functional group Suitable allyl compounds include allylbenzene, 2-allylphenol, alpha-allylnaphthalene, 3-allylcyclopentene and mixtures thereof.

Examples of functionalized allyl compounds bearing functional groups including hydroxyl, amino, cyano, carboxyl, silane, phosphonate and ether moieties include allyl alcohol, methallyl alcohol, 2-phenylallyl alcohol, 2-methylene propanediol, 1,1-dimethylallyl alcohol, methallylamine, N-allylacetamide, allyi acetate, trimethylallylsilane, and diethyl acetonyallylphosponate, N-allylamidazole, 2-allylpyrrole and mixtures thereof.

When an ether group is present on the allyl compound, the ether group can be a functionalized or non-functionalized alkyl, aryl, or cycloaliphatic species. Specific examples include allyl glycidyl ether, heptafluoroisopropyl allyl ether, heptafluoroisopropyl methallyl ether, allyl acetone, methallylacetone, 2-allylcyclohexanone, 1-phenyl-4-pentene-1-one, diallyl ether, and mixtures thereof.

Alpha-olefins can also be used for the vinyl monomer component. Preferably, these are the lower alpha-olefins, that is, materials with a carbon chain length of less than about 20. Specific examples include ethylene, propylene, isobutene, diisobutylene, 1-octene, and 1-decene, and mixtures thereof with the preferred material being 1-decene. Cycloaliphatic olefins are also suitable and include, for example, cyclobutene, cyclopentene, 1-methylcyclopropene, methylenecyclopentene, cyclohexene, cycloheptene, cyclooctene, and mixtures thereof.

The vinyl monomer component can also comprise diene compounds including cycloaliphatic dienes. Examples of dienes include butadiene, isoprene, trans-piperylene, and mixtures thereof. Substituted butadiene compounds can be used, for example, 2,3-dimethylbutadiene, 2,3-dichlorobutadiene, 1-cyclohexyloxy-1,3-butadiene, 2,3-bis(diethylphosphono)-1,3-butadiene, 2,4-hexadiene, 1,3-pentadiene, 1,4-pentadiene, 1-methoxybutadiene, and mixtures thereof.

Cycloaliphatic dienes include, for example, cyclopentadiene, 1,4-cyclohexadiene, 1,3-cycloheptadiene, 1,3-cyclooctadiene, 1,5-cyclooctadiene, 3-(4'-pentenyl)-cyclopentene-1, 3-allylcyclopentene, 4-allylcyclopentene, 3-allylcyclohexene, 4-allylcyclohexene, and mixtures thereof.

Additionally, the vinyl monomer component can comprise mixtures of any of the materials described above.

The dicarboxylic acid diester units of the copolymer of the present invention are prepared from a dicarboxylic acid and a polyether glycol, or from a diester that is capable of transesterifying with a polyether glycol. The diacid or diester starting material requires two carboxyl groups situated around a carbon-carbon double bond for subsequent copolymerization with the vinyl monomer. Either the cis or trans isomer is suitable. Suitable materials are represented by Structure VII, shown below:

Structure VII

Dicarboxylic Acids Suitable for the Present Invention

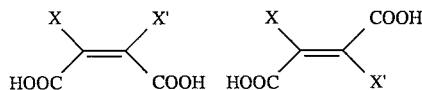

Wherein: X and X' are independently represented by H, alkyl, aryl, or cycloaliphatic groups with a carbon chain length of 1 to about 20

Suitable dicarboxylic acids include aliphatic dicarboxylic acids, aromatic dicarboxylic acids, cycloaliphatic dicarboxylic acids, and mixtures thereof. Specific examples include maleic acid, citraconic acid, itaconic acid, and mixtures thereof. Aliphatic dicarboxylic acids are preferred, and maleic acid is particularly preferred.

The dicarboxylic acids described above are typically, though not necessarily, produced from diesters of the dicarboxylic acid, preferably dialkyl diesters. Such dialkyl diesters are stable, inexpensive, and readily available from commercial sources. The lower dialkyl diesters, with esterifying groups containing no more than about 10 carbon atoms, are preferred because of their greater reactivity, with dimethyl diesters being most preferred. Straight-chain alkyl esterifying groups are preferred to branched alkyl, cycloaliphatic or aromatic esterifying groups, also because of their greater reactivity. The dimethyl diester of maleic acid (dimethyl maleate) is particularly preferred.

Generally, dicarboxylic acid formation is accomplished by heating the diester described under acidic conditions, and removing by distillation the alcohol that is formed when the esterifying groups are stripped from the diester. The distillation temperature is determined by the species of alcohol that is to be removed. In the preferred embodiment mentioned above, methanol is stripped from dimethyl maleate at a temperature of from about 150° C. to about 170° C., most preferably at a temperature of about 160° C.

The dicarboyxlic acids prepared as above are then esterified with a polyether. Preferably, the polyether esterifying group is contributed by a polyethylene glycol represented by Structure VIII, shown below:

Structure VIII

Polyethylene Glycols Suitable for the Present Invention

Wherein: n=1 to about 20; and R=a substituted or unsubstituted alkyl, cycloaliphatic, or aryl group, with a carbon chain length of 1 to about 20.

Preferably, R is an alkyl group which is a methyl group and n is chosen such that the polyethylene glycol had a number-average molecular weight of from about 100 to about 3,000, more preferably from about 700 to about 1,000, most preferably from about 700 to about 800, as measured by gel permeation chromatography using polystyrene as a standard.

The materials described above are commercially available from Union Carbide Corporation under the registered trademark CARBOWAX®. The preferred material is CARBOWAX 750, a methoxy polyethylene glycol with a number-average molecular weight of from about 715 to about 785, as reported by the supplier.

The dicarboxylic acid and the polyether described above are transesterified, using a molar ratio of from about 1.0:0.10 to about 1.0:1.0. Preferably, dimethyl maleate and CARBOWAX 750 are used in a molar ratio of from about 1.0:0.10 to about 1.0:0.40, most preferably, a molar ratio of about 1.0:0.25.

Typically, the transesterification reaction produces a small fraction comprising the initial diester that remained unreacted (preferably dimethyl maleate), a large fraction comprising a diester in which one of the esterifying groups is a polyether while the other esterifying group is an organic group free of polyether groups. A small fraction comprising a diester in which both of the esterifying groups are polyethers. The preferred diester has one esterifying group that is a polyether and one that is an alkyl group, preferably a methyl group. Typically, though, a mixture of species is used to prepare the copolymer of the present invention. It is preferred that at least about 30 percent of the mixture by weight comprises a diester having one esterifying group that is a polyether and one that is an alkyl group, preferably a methyl group.

The transesterification reaction typically is conducted in the presence of an acid or base catalyst. Acid catalysts are preferred, most preferably butyl stannoic acid.

Preferably, the copolymer of the present invention is prepared immediately after the transesterification step is complete, using the same reaction vessel. However, one can also prepare the diester and the copolymer in separate steps.

Typically, polymerization of the copolymer is initiated by free radical initiators, examples of which include peroxy initiators such as benzoyl peroxide, lauroyl peroxide, di-terc-amyl peroxide, or tert-butylperoxy-2-ethyl hexanoate (tert-butylperoctoate); or azo initiators such as 2,2'-azobis(2-methylbutane nitrile). The peroxide initiators are preferred, with di-tert-amyl peroxide being particularly preferred.

The vinyl monomer component and the diester component described above characteristically react to produce an alternating copolymer rather than a random copolymer.

When synthesizing the alternating copolymer, it is preferred to discourage the formation of repeating units of vinyl monomer; further, it is often desirable to control the molecular weight of the alternating copolymer. Typically, this is achieved by "starving" the reaction, that is, by adding an amount of initiator to the diester prepared above, then slowly and continuously adding additional initiator and the vinyl monomer component to the reaction vessel at a controlled rate such that self-polymerization of the vinyl monomer component is discouraged. When this procedure is followed, it is believed that the reaction product is predominantly an alternating polymer represented by the structural formula $(A_xB_y)_m$, where A represents a single unit comprising a diester of a dicarboxylic acid, B represents a single unit comprising a vinyl monomer, x and y are equal to 1, and m is an integer equal to or larger than 1. In other words, the formation of alternating block copolymers where either x or y, or where both x and y, are integers larger than 1 is discouraged. It is theoretically possible that some portions along the copolymer chain contain repeating units of vinyl monomer; however, it is believed these areas are essentially eliminated by adjusting the feed rates of the initiator and the vinyl monomer component.

After all the vinyl monomer component has been added, the reaction mixture is usually held at the reaction temperature for a period of time ranging from about 30 minutes to about 8 hours, preferably from about 60 minutes to about 90 minutes, to ensure the reaction is complete. The resultant copolymer solution generally has a solid content, determined at 110° for 60 minutes, of from about 40 percent to about 95 percent, preferably from about 70 percent to about 80 percent by weight, the percentages based on the weight of the copolymer solution.

The copolymers of the present invention are useful as vehicles in which to prepare pigment dispersions, particularly when the pigment to be dispersed comprises a so-called "flake" pigment, that is, a metallic or a metallic-effect pigment. Besides the copolymer, the pigment dispersion of the present invention comprises a pigment component and, optionally, a diluent.

The pigment component can contain inorganic, organic, metallic, metallic-effect, filler and anti-corrosive pigments, and mixtures thereof. Suitable inorganic pigments include titanium dioxide, iron oxide, lead chromate, chrome green, cadmium sulfide, lithopone pigments, and the like. Suitable organic pigments include carbon black; monoazo, diazo, and benzimidazolone yellows, oranges, reds, and browns; phthalocyanine blues and greens; anthraquinone pigments ranging from yellow to blue; quinacridone yellows, reds and violets; perylene reds and browns; indigoid reds, blues, and violets; thioindigo violets; isoindolinone yellows, oranges and reds; quinoline yellows, and the like. Suitable metallic and metallic-effect pigments include aluminum, zinc, lead, bronze, copper, stainless steel and mica flake, and the like. Suitable filler pigments include magnesium silicate clays, fumed or precipitated silicas, barytes, blanc fixe, china clay, and the like. Suitable anti-corrosive pigments include lead oxide, zinc chromate, zinc phosphate, micaceous iron oxide, and the like. Mixtures containing any of the pigments described above are also suitable. In a preferred embodiment, fumed silica and aluminum flake pigments are dispersed in the copolymer to form the dispersions of the present invention.

Generally, the copolymer is present at a level of from about 0.10 percent to about 100 percent, preferably from about 1 percent to about 50 percent, more preferably from about 2 percent to about 15 percent by weight, the percentages based on the weight of pigment present in the dispersion.

Optionally, the pigment dispersion of the present invention further comprises a diluent. The diluent serves to reduce the viscosity of the dispersion and to assist in pigment wetting. Typically, the diluent comprises an organic solvent. Suitable organic solvents include ketones such as methyl isobutyl ketone, methyl ethyl ketone, diisobutyl ketone, and the like; esters such as butyl acetate, isobutyl acetate, pentyl propionate, and the like; alcohols such a methanol, ethanol, propanol, butanol, isobutanol, and the like; or glycol ethers such as the monoalkyl ethers of ethylene glycol, diethylene glycol, or propylene glycol, and the like.

Water is a suitable diluent, provided there is no phase separation when water is mixed with the claimed copolymers and no incompatibility with the pigment component of the dispersion. For example, water is generally not used with aluminum flake pigments because these materials can coreact, producing hydrogen gas which causes pressure build up in storage containers.

Although organic solvents are the preferred diluents, suitable alternative diluents include nonreactive oligomeric or polymeric materials with a viscosity ranging from about 20 centipoise to about 1,000 centipoise as measured with a Brookfield viscometer at about 72° F., (22° C.) and a glass transition temperature lower than about 35° C. as measured by any of the common thermal analytical methods well understood by those skilled in the art. Specific examples include plasticizers such as tributyl phosphate, dibutyl maleate, butyl benzyl phthalate, dibutyl benzyl phthalate and mixtures thereof; silane compounds such as vinyl trimethoxy silane, gamma-methacryloxypropyl trimethoxy silane, and mixtures thereof; anionic surfactants such as sodium lauryl sulfate, sodium cetyl sulfate, ammonium nonylphenoxy (polyethoxy)$_{6-60}$ sulfonate, and mixtures thereof; cationic surfactants such as tetramethyl ammonium chloride, ethylene oxide condensates of cocoamines, and mixtures thereof; non-ionic surfactants such as octylphenoxy polyethoxy ethanol, nonylphenoxy (polyethoxy)$_{6-60}$ ethanol, dodecylphenoxy (polyethoxy)$_{6-60}$ ethanol, the ethylene oxide derivatives of lauric and oleic acid, the ethylene oxide condensates of octyl, tecyl, lauryl or cetyl alcohol, or mixtures thereof. Mixtures of any of these alternative diluents and organic solvents are suitable as well.

Mixtures of organic solvents are appropriate diluents, as are mixtures of water and water-reducible organic solvents, provided there is no incompatibility with the pigment component of the dispersion. The term water-reducible, as used herein, describes any organic solvent that mixes with water without producing a phase separation. Mixtures of nonreactive oligomeric or polymeric diluents can be used alone, in combination with any organic solvent mixture, or in combination with water, provided there is no phase separation when the diluents are mixed with the copolymer of the present invention.

Preferably, a diluent comprising a water-reducible organic solvent is used. The preferred water-reducible organic solvent is a glycol ether solvent, or a mixture of glycol ethers. A mixture comprising the monohexyl ether of ethylene glycol and the monomethyl ether of dipropylene glycol is particularly preferred.

When present, the diluent is generally used at a level of from about 0.1 percent to about 500 percent, preferably from about 20 percent to about 400 percent, more preferably from about 50 percent to about 200 percent by weight, the percentages based on the weight of pigment present in the dispersion.

Optionally, the pigment dispersions of the present invention can contain an auxiliary polymer. The purpose of the auxiliary polymer is to modify the properties of the pigment dispersion, or to modify the properties of the coating composition to which the pigment dispersion is subsequently added. For example, it is often desirable to increase the solids level of a pigment dispersion or a coating composition without producing a large increase in viscosity. Often, too, it is desirable to modify the pigment wetting characteristics of the vehicle used to prepare the pigment dispersion. Similarly, it is often desirable to modify certain physical properties of the coating composition to which the pigment dispersion is subsequently added, for example the appearance, gloss, humidity resistance, mar resistance or chemical resistance of the cured film.

A variety of materials are suitable for use as the auxiliary polymer. These include, but are not limited to, acrylic polymers, polystyrene polymers, acrylonitrile polymers, polyester polymers, epoxy polymers, polyamide polymers, butadiene polymers, polyalkylene polymers, polyalkylene glycol polymers, aminoplast resins, polyurethane polymers, polysilane polymers, polysiloxane polymers, and the like. Additionally, the auxiliary polymer can contain functional groups including but not limited to hydroxyl groups, carboxyl groups, amino groups, epoxy groups, phosphate groups, and the like. Mixtures of auxiliary polymers are also appropriate. Synthetic methods for preparing these auxiliary polymers are well understood by those skilled in the art of polymer chemistry, and will not be discussed in further detail here.

Preferably, the optional auxiliary polymer is water-dispersible. The term water-dispersible, as used herein, describes any polymer that is soluble, emulsifiable, or dispersible in water or in a mixture of water and water-reducible organic solvent. This category includes, for example, solution polymers, dispersion polymers and suspension polymers.

In one preferred embodiment, an auxiliary polymer is present to increase the solids level of the pigment dispersion without producing a large increase in viscosity. In this embodiment, it is preferred that the auxiliary polymer have a solids content of from about 25 percent to about 100 percent by weight, the percentages based on the weight of the polymer solution; additionally, it is preferred that the auxiliary polymer have a viscosity of from about 1,000 centipoise to about 10,000 centipoise, as measured with a Brookfield viscometer at about 72° F. (22° C.). In this embodiment, the preferred auxiliary polymer is a polyester polymer.

In another preferred embodiment, an auxiliary polymer is present to modify the pigment wetting properties of an aluminum pigment dispersion. In this embodiment, the preferred auxiliary polymer is a alkylene glycol polymer, preferably polypropylene glycol.

When present, it is preferred that the auxiliary polymer be present at a level of from about 0.10 percent to about 100 percent, preferably from about 1 percent to about 50 percent, more preferably from about 2 percent to about 25 percent by weight, the percentages based on the weight of pigment present in the dispersion.

The pigment dispersion can contain other optional ingredients, for example, additional anti-settling additives, pigment wetting additives, gassing inhibitors, corrosion inhibitors, anti-foaming additives, surface tension modifiers, mildewcides, rheology modifiers, waxes, metal passivators, inorganic or organic acids or bases, UV light absorbers, and the like. When present, these additives are generally used at a level of from about 0.10 percent to about 200 percent, preferably from about 0.25 percent to about 5 percent by weight, the percentages based on the weight of pigment present in the dispersion. Typically, the dispersion is subsequently added to a coating composition, thus diluting the additives. After the dilution, the additive levels described above generally correspond to levels up to about 10 percent by weight, preferably up to about 5 percent by weight, the percentages based on the weight of solids in the coating composition to which the pigment dispersion is added.

The pigment dispersions of the present invention can be produced by a variety of methods, for example, by mixing with a cowles blade or with a high-speed mixer; or by grinding with any of the conventional pieces of dispersion equipment, for example, ball mills, sand mills, attritors, impellers, roller mills, homogenizers, ultrasonic dispersers, and the like.

In the case of a dispersion that is produced by grinding, the copolymer of the present invention can be used as a dispersion vehicle alone, or in combination with an auxiliary polymer; or the copolymer can be added to the pigment dispersion after the grinding stage has been completed.

In order to produce a variety of appearance effects, the claimed pigment dispersions can be blended with other pigment dispersions containing any of the common grind vehicles and pigments, and prepared according to any of the common dispersion methods. These materials and methods are well known by those skilled in the coatings art, and will not be discussed in further detail here.

Also claimed is a coating composition comprising a film-forming polymer and the pigment dispersion described above. Preferably, the coating composition is aqueous, rather than solvent-borne, though either is suitable. Further, preferably the coating composition is thermoplastic rather than thermosetting, though either is suitable. Also, preferably the coating composition is air-dried, rather than a forced-dried or forced-cured, though either is suitable.

A variety of materials are suitable for use as the film-forming polymer. These include, but are not limited to, acrylic polymers, polystyrene polymers, acrylonitrile polymers, polyester polymers, epoxy polymers, polyamide polymers, aminoplast resins, polyurethane polymers, and the like. Mixtures of any of the film-forming polymers described above are also appropriate. Synthetic methods for preparing the film-forming polymers of the present invention are well understood by those skilled in the art of polymer chemistry, and will not be discussed in further detail here.

Preferably the film-forming polymer is a water-dispersible thermoplastic polymer, particularly an acrylic latex.

When the film-forming polymer is a thermosetting polymer, the coating composition typically also contains a crosslinker. Typical crosslinkers well known to those skilled in the art include, but are not limited to, melamine-formaldehyde resins, glycouril resins, benzoguanamine resins, and isocyanate-functional resins.

In a preferred embodiment, the pigment dispersion contains a metallic or metallic-effect pigment. Specifically, this preferred embodiment employs a pigment dispersion containing aluminum flake pigment or a mixture of pigments containing at least one aluminum flake pigment. Alternatively, this preferred embodiment employs a pigment dispersion containing mica pigment or a mixture of pigments containing at least one mica pigment.

As has been mentioned above, in order to produce a variety of appearance effects, the claimed pigment dispersions can be blended with other pigment dispersions containing any of the common grind vehicles and pigments, and prepared according to any of the common dispersion methods.

Typically and preferably, the pigment dispersion is prepared as described above, using the copolymer of the present invention as the dispersion vehicle, either alone or in combination with an auxiliary polymer. However, one can also prepare the pigment dispersion without using the copolymer of the present invention, but rather using an auxiliary polymer or blend of polymers as the dispersion vehicle. When this is done, the copolymer of the present invention is added to the coating composition at a later stage. This can be achieved, for example, by mixing the copolymer of the present invention with the film-forming polymer; alternatively, the copolymer of the present invention can be mixed into the fully formulated coating composition.

Typically, the copolymer of the present invention is present in the coating composition at a level of from about 2 percent to about 15 percent by weight, the percentages based on the weight of the pigment in the dispersion.

Generally, the pigment is present at a level of from about 2 percent to about 60 per cent by weight, based on the weight of the pigment plus the weight of the film-forming resin.

Optionally, the coating compositions of the present invention can further comprise a diluent. The diluent serves to reduce the viscosity and modify the conductivity storage stability and solubility of the various polymers in the coating composition. Typically, the diluent comprises an organic solvent. Suitable organic solvents include the ketones, ethers, alcohols and glycol ethers which have been described in detail above in connection with the pigment dispersion.

Water is also a suitable diluent, preferably deionized water.

Although organic solvents are the preferred diluents, suitable alternative diluents include the nonreactive oligomeric or polymeric materials with a viscosity ranging from about 20 centipoise to about 1,000 centipoise as measured with a Brookfield viscometer at about 72° F. (22° C.), and a glass transition temperature lower than about 35° C. which have been described in detail above in connection with the pigment dispersion.

Mixtures of organic solvents are appropriate diluents, as are mixtures of water and water-reducible organic solvents. Mixtures of nonreactive oligomeric or polymeric diluents can be used alone, in combination with any organic solvent mixture, or in combination with water, provided there is no phase separation when the diluents are mixed together, or when the diluents are mixed with the pigment dispersion and the film-forming polymer used to prepare the coating composition of the present invention.

Preferably, a diluent comprising a mixture of water and water-reducible organic solvents is used. The preferred water-reducible organic solvent is a glycol ether solvent, or a mixture of glycol ethers. In aqueous based coating compositions which contain a mixture of water and water-reducible organic solvents, optimally the mixture contains mostly water, that is, the mixture preferably contains from about 75 percent to about 100 percent water by weight, the percentages based on the weight of all solvents used in the coating composition.

The coating composition can contain other optional ingredients, such as plasticizers, anti-oxidants, UV light absorbers, surfactants, flow control agents, thixotropic agents, anti-gassing agents, organic co-solvents, catalysts, anti-foaming additives, anti-settling additives, pigment wetting additives, surface tension modifiers, waxes, metal passivators, inorganic or organic acids or bases, mildewcides and the like. When present, these materials are generally used at a level of from about 0.01 percent to about 50 percent, preferably from about 0.10 percent to about 5 percent by weight, the percentages based on the weight of the film-forming polymer used in the coating composition.

One-package, two-package or multi-package systems can be employed herein. In a preferred embodiment, the coating composition is a three-package system, comprising a binder package, a pigment package, and a reducer package. In this embodiment, the binder package contains the film-forming polymer, various additives, and a diluent comprising deionized water; the pigment package contains the pigment dispersion as described above; and the reducer package contains a diluent comprising deionized water, water-reducible organic solvents, or mixtures thereof. Optionally, the reducer package may further comprise any of the additives mentioned above. All three packages are blended just before application of the coating composition.

Use of a multi-package system that is blended immediately prior to application, such as the one described above, facilitates formulation of aqueous-based coating compositions containing aluminum flake pigment without gassing problems.

The coating compositions of the present invention can be applied to any of the various substrates to which they adhere. Specific examples of suitable substrates include wood, metals, glass, cloth, plastic, foam, elastomeric substrates, and the like. The compositions can be applied by conventional means, including brushing, dipping, flow coating, spraying and the like, but preferably, they are applied by spraying. The usual spray techniques and equipment for air-spraying or electrostatic spraying can be used.

The coating compositions of the present invention can be applied as primers, as pigmented one-coat topcoat systems, or as the pigmented basecoat in color-plus-clear systems.

When used as primers or pigmented one-coat topcoat systems, the coating composition is generally applied to the substrate to a uniform thickness of from about 0.25 mils to about 5.0 mils, preferably from about 0.50 mils to about 2.0 mils. Once the coating composition is applied, film formation can be achieved under ambient conditions, or by heating, depending on the nature of the film-forming polymer.

When used as the pigmented basecoat in a color-plus-clear system, typically, first the pigmented basecoat is applied to a uniform film thickness of from about 0.25 mil to about 1.5 mils. This basecoat is then "flashed," that is, it is left to stand at temperatures ranging from the ambient temperature to about 80° C. for about 10 seconds to about 30 minutes or longer before another coating composition is applied thereto. Then, typically, a clear topcoating composition is applied over the coated substrate in one or more coats to a uniform film thickness from about 1.0 mil to about 5.0 mils. The coated substrate is then flashed again and finally dried or cured under ambient conditions, or by baking when the coating composition is to be baked, it is typically baked from about 20 minutes to about 40 minutes at from about 100° C. to about 200° C.

EXAMPLES

Illustrating the invention are the following examples, which are not to be considered as limiting the invention to their details. All parts and percentages in the examples as well as throughout the specification are by weight unless otherwise indicated.

The following examples show the preparation of various copolymers that are used as pigment dispersing additives. The formulation of several pigment dispersions and coating compositions containing the pigment dispersing additives are shown as well. For the purposes of comparison, a pigment dispersion and a coating composition were prepared without using the pigment dispersing additive of the present invention.

Examples A and B show the preparation of aqueous polymeric intermediates used in the formulation of coating compositions that illustrate the present invention. Examples I–IV show the preparation of four different pigment dispersing additives that illustrate the present invention. Examples 1–2 show the preparation of pigment dispersions and coating compositions using pigment dispersing additives in accordance with the present invention. Example 3 is a comparative example showing the preparation of a pigment dispersion and a coating composition without using the pigment dispersing additives of the present invention.

The anti-settling properties of the pigment dispersions of Examples 1–3 were evaluated, and the results are shown in Table I. The appearance of the coating compositions of Examples 1–3 was evaluated, and the results are shown in Table II.

In all the examples, polymer viscosity was measured with Gardner-Holt bubble tubes, commercially available from Gardner. Paint viscosity was measured with a Brookfield viscometer, model RVT, commercially available from Brookfield Engineering Labs, Inc., at about 72° F. (22° C.) using a #3 spindle at 60 RPM. Color was visually compared to Gardner color standards, commercially available from Gardner. Weight percent solids were determined at 110° C. for one hour. Number-average molecular weight was determined by gel permeation chromatography, using polystyrene as a standard.

The theoretical acid value of all the copolymers produced in Examples I–IV, as calculated by methods well understood by those skilled in the art, was less than 1.0.

EXAMPLE A

Preparation of an Aqueous Polymeric Intermediate

The following ingredients were used to make an aqueous polymeric intermediate package that was used in the formulation of coating compositions illustrating the present invention.

| INGREDIENTS | WEIGHT IN GRAMS |
|---|---|
| Deionized Water | 276.75 |
| Hectorite Clay Solution[1] | 89.67 |
| DSX-1550[2] | 11.24 |
| RHOPLEX ® WL-96[3] | 453.64 |
| SANTICIZER ® 160[4] | 22.42 |
| SURFYNOL ® DF-210[5] | 0.44 |
| TOTAL | 854.16 |

[1] The Hectorite clay solution contained 5% by weight BENTONE ® EW clay, commercially available from Rheox, Incorporated, and 95% by weight deionized water, the percentages based on the total weight of the solution.
[2] A urethane associative thickener, commercially available from Henkel Corporation.
[3] An acrylic emulsion commercially available from Rohm & Haas Company.
[4] Butyl benzyl phthalate, a plasticizer, commercially available from Monsanto Chemical Company.
[5] A defoamer, commercially available from Air Products and Chemicals.

In a lined container, the hectorite clay solution was added to the deionized water under medium agitation until a homogeneous solution was produced. The DSX-1550 was then slowly added, increasing the viscosity. The RHOPLEX WL-96 was added next, and stirred until completely dispersed. Finally, the SANTICIZER 160 and the SURFYNOL DF-210 were added, and agitation continued for 15 minutes to ensure proper incorporation of all components.

EXAMPLE B

Preparation of an Aqueous Polymeric Intermediate

The following ingredients were used to make an aqueous polymeric intermediate package that was used in the formulation of coating compositions illustrating the present invention.

| INGREDIENTS | WEIGHT IN GRAMS |
|---|---|
| Deionized Water | 600.00 |
| Hectorite Clay Solution of Example A | 194.40 |
| DSX-1550 | 24.40 |
| RHOPLEX ® WL-96 | 983.50 |
| SANTICIZER ® 160 | 48.60 |
| SURFYNOL ® DF-210 | 0.96 |
| TOTAL | 1851.86 |

In a lined container, the hectorite clay solution was added to the deionized water under medium agitation until a homogeneous solution was produced. The DSX-1550 was then slowly added, increasing the viscosity. The RHOPLEX WL-96 was added next, and stirred until completely dispersed. Finally, the SANTICIZER 160 and the SURFYNOL DF-210 were added, and agitation continued for 15 minutes to ensure proper incorporation of all components.

EXAMPLE I

Preparation of a Pigment Dispersing Additive

A pigment dispersing additive illustrating the present invention was prepared. Dimethyl maleate was transesterified with polyethylene glycol, and this material was copolymerized with styrene. The following ingredients were used to make the pigment dispersing additive.

| INGREDIENTS | WEIGHT IN GRAMS |
|---|---|
| CHARGE I | |
| Dimethyl Maleate | 864.0 |
| CARBOWAX 750[1] | 1125.0 |
| Butyl Stannoic Acid | 17.3 |
| CHARGE II | |
| PROPASOL ® p[2] | 600.0 |
| CHARGE III | |
| Di-t-Amyl Peroxide | 313.0 |
| CHARGE IV | |
| Styrene | 624.0 |
| TOTAL | 3543.3 |

[1] Polyethylene glycol with a number-average molecular of about 750 as reported by the supplier, commercially available from Union Carbide Corporation.
[2] The monopropyl ether of propylene glycol, commercially available from Union Carbide Corporation.

The dimethyl maleate, CARBOWAX 750, and butyl stannoic acid were added to a five liter round bottom flask fitted with a stirrer, a condenser with an azeotropic trap, and a nitrogen sparge line. The mixture was heated to 160° C. for three hours under a light nitrogen sparge and methyl alcohol was removed. The temperature was then lowered to 145° C. and the PROPASOL P was added.

After the temperature stabilized again at 145° C., the di-t-amyl peroxide charge was added in a continuous manner over three hours. Ten minutes after the di-t-amyl peroxide feed began, the styrene charge was added through a separate addition funnel in a continuous manner over 2½ hours. The reaction mixture was heated during the additions. The temperature fell as the reaction mixture refluxed. When the reaction mixture reached a temperature of 140° C., the distillate was removed and the temperature of the reaction mixture began to climb again. This procedure continued to maintain a temperature of 140° C.–145° C. during the entire addition stage. When the additions were completed, the reaction mixture was maintained at 145° C. for one hour, then cooled to 110° C.

The reaction mixture was filtered to produce a copolymer solution with a Gardner-Holt viscosity of Z1; a Gardner color of 2; and a solid content of 83.27% by weight. Gel permeation chromatography showed that the copolymer solution had a bimodal molecular weight distribution, with peaks at number-average molecular weights of 2,093 and 38,009.

EXAMPLE II

Preparation of a Pigment Dispersing Additive

A pigment dispersing additive illustrating the present invention was prepared. Dimethyl maleate was trans-esterified with polyethylene glycol, and this material was copolymerized with allyl butyrate. The following ingredients were used to make the pigment dispersing additive.

| INGREDIENTS | WEIGHT IN GRAMS |
| --- | --- |
| CHARGE I | |
| Dimethyl Maleate | 432.0 |
| CARBOWAX 750 | 562.5 |
| Butyl Stannoic Acid | 8.7 |
| CHARGE II | |
| PROPASOL P | 300.0 |
| CHARGE III | |
| Di-t-Amyl Peroxide | 156.5 |
| CHARGE IV | |
| Allyl Butyrate | 342.0 |
| TOTAL | 1801.7 |

The dimethyl maleate, CARBOWAX 750, and butyl stannoic acid were added to a three liter round bottom flask fitted with a stirrer, a condenser with an azeotropic trap, and a nitrogen sparge line. The mixture was sparged with nitrogen for five minutes, then the sparge line was removed and the flask was fitted with a cap. The reaction mixture was heated to 160° C. and held for three hours while methyl alcohol was removed. The temperature was then lowered to 145° C. and the PROPASOL P was added.

After the temperature stabilized again at 145° C., the di-t-amyl peroxide charge was added in a continuous manner over three hours. Ten minutes after the di-t-amyl peroxide feed began, the allyl butyrate charge was added through a separate addition funnel in a continuous manner over 2½ hours. The reaction mixture was heated during the additions. The temperature fell as the reaction mixture refluxed. When the reaction mixture reached a temperature of 140° C., the distillate was removed and the temperature of the reaction mixture began to climb again. This procedure continued to maintain a temperature of 140° C.–145° C. during the entire addition stage. When the additions were completed, the reaction mixture was maintained at 145° C. for one hour, then cooled to 110° C.

The reaction mixture was filtered to produce a copolymer solution with a Gardner-Holt viscosity of Z1–Z2; a Gardner color of 2; and a solid content of 80.50% by weight. Gel permeation chromatography showed that the copolymer solution had a bimodal molecular weight distribution, with peaks at number-average molecular weights of 1,991 and 38,653.

EXAMPLE III

Preparation of a Pigment Dispersing Additive

A pigment dispersing additive illustrating the present invention was prepared. Diethyl maleate was trans-esterified with a triblock polyol prepared from alkylene oxides, and this material was copolymerized with styrene. The following ingredients were used to make the pigment dispersing additive.

| INGREDIENTS | WEIGHT IN GRAMS |
| --- | --- |
| CHARGE I | |
| PLURONIC ® F-68[1] | 69.0 |
| Butyl CELLOSOLVE ®[2] | 86.0 |
| Diethyl Maleate | 172.0 |
| CHARGE II | |
| Di-t-Amyl Peroxide | 52.2 |
| CHARGE III | |
| Styrene | 104.0 |
| CHARGE IV | |
| Deionized Water | 948.8 |
| CHARGE V | |
| Deionized Water | 100.0 |
| TOTAL | 1432.0 |

[1]An ethylene oxide/propylene oxide/ethylene oxide triblock polyol with a number-average molecular weight of about 8350 as reported by the supplier, commercially available from BASF Corporation.
[2]The monobutyl ether of ethylene glycol, commercially available from Union Carbide Corporation.

The PLURONIC F-68, Butyl CELLOSOLVE and diethyl maleate were added to a two liter round bottom flask fitted with a stirrer, a condenser with an azeotropic trap, and a nitrogen sparge line. The mixture was sparged with nitrogen for five minutes, then the sparge line was removed and the flask was fitted with a cap. the reaction mixture was heated to 160° C. and held for three hours while methyl alcohol was removed. The temperature was then lowered to 145° C.

After the temperature stabilized at 145°, the di-t-amyl peroxide charge was added in a continuous manner over two hours. Ten minutes after the di-t-amyl peroxide feed began, the styrene charge was added through a separate addition funnel in a continuous manner over 1½ hours. The reaction mixture was heated during the additions. The temperature fell as the reaction mixture refluxed. When the reaction mixture reached a temperature of 140° C., the distillate was removed and the temperature of the reaction mixture began to climb again. This procedure continued to maintain a temperature of 140° C.–145° C. during the entire addition stage. When the additions were completed, the reaction mixture was maintained at 145° C. for one hour. At this point, the reaction mixture had a Gardner-Holt viscosity of X+; a Gardner color of 1; and a solid content of 75.98% by weight. Gel permeation chromatography showed that the copolymer solution had a bimodal molecular weight distribution, with peaks at number-average molecular weights of 1,608 and 181.

The reaction mixture was then poured slowly into 948.8 grams of deionized water under agitation to produce a dispersion. To improve the quality of the dispersion, the material was transferred to a one gallon can, and 100 grams more of deionized water was added under agitation with a high lift blade.

EXAMPLE IV

Preparation of a Pigment Dispersing Additive

A pigment dispersing additive illustrating the present invention was prepared. Dimethyl maleate was trans-esterified with a mixture of polyethylene glycol and an aromatic polyether, and this material was copolymerized with styrene. The following ingredients were used to make the pigment dispersing additive.

| INGREDIENTS | WEIGHT IN GRAMS |
| --- | --- |
| CHARGE I | |
| Dimethyl Maleate | 144.0 |
| TRITON ® N-101[1] | 41.3 |
| CARBOWAX 750 | 140.6 |
| Butyl Stannoic Acid | 2.9 |
| CHARGE II | |
| PROPASOL P | 100.0 |
| CHARGE III | |
| Di-t-Amyl Peroxide | 52.2 |
| CHARGE IV | |
| Styrene | 104.0 |
| TOTAL | 585.0 |

[1]Nonylphenoxy polyethoxy ethanol, commercially available from Rohm and Haas Company.

The dimethyl maleate, TRITON N-101, CARBOWAX 750, and butyl stannoic acid were added to a one liter round bottom flask fitted with a stirrer, a condenser with an azeotropic trap, and a nitrogen sparge line. The mixture was heated to 165° C. with a light nitrogen sparge and held for two hours while methyl alcohol was removed. The temperature was then lowered to 145° C. and the PROPASOL P was added. After the temperature stabilized again at 145° C., the di-t-amyl peroxide charge was added in a continuous manner over two hours. Ten minutes after the di-t-amyl peroxide feed began, the styrene charge was added through a separate addition funnel in a continuous manner over 1½ hours. The reaction mixture was heated during the additions. The temperature fell as the reaction mixture refluxed. When the reaction mixture reached a temperature of 140° C., the distillate was removed and the temperature of the reaction mixture began to climb again. This procedure continued to maintain a temperature of 140° C.–145° C. during the entire addition stage. When the additions were completed, the reaction mixture was maintained at 145° C. for one hour, then cooled to 110° C. The reaction mixture was filtered to produce a copolymer solution with a Gardner-Holt viscosity of Z3; a Gardner color of 3–4; and a solid content of 79.83% by weight. Gel permeation chromatography showed that the copolymer solution had a trimodal molecular weight distribution, with peaks at number-average molecular weights of 36,193, 1,929, and 138.

EXAMPLE 1

Preparation of a Pigment Dispersion and a Coating Composition Using the Pigment Dispersing Additives of the Present Invention A pigment dispersion and a coating composition were prepared using pigment dispersing additives prepared in accordance with the present invention.

First, the pigment dispersing additive of Example I was used as dispersion vehicle to prepare a fumed silica dispersion using the following ingredients.

| INGREDIENT | WEIGHT IN GRAMS |
| --- | --- |
| Pigment Dispersing Additive of Example I | 110.90 |
| Hexyl CELLOSOLVE ®[1] | 162.60 |
| DOWANOL ® DPM[2] | 40.00 |
| AEROSIL ® R972[3] | 20.60 |
| TOTAL | 323.20 |

[1]The monohexyl ether of ethylene glycol, commercially available from Union Carbide Corporation.
[2]The monomethyl ether of dipropylene glycol, commercially available from Union Carbide Corporation.
[3]Fumed silica, commercially available from Degussa Corporation. Pigments Division.

The hexyl CELLOSOLVE and the DOWANOL PM were added to the pigment dispersing additive under medium agitation using a cowls blade. Next, the AEROSIL R972 was sifted into the mixture, and agitation continued until the silica was completely wetted. An impeller blade was substituted for the cowls blade, and 200 grams of ceramic zircoa beads were added. The mixture was ground for about 30 minutes until a Hegman reading of 7.0 to 7.5 was achieved.

The fumed silica dispersion described above was used to prepare a pigment dispersion using the following ingredients.

| INGREDIENT | WEIGHT IN GRAMS |
| --- | --- |
| Hexyl CELLOSOLVE | 6.02 |
| DOWANOL DPM | 2.67 |
| Aluminum Paste 8160N-A[2] | 5.26 |
| ARCOL ® PPG-425[1] | 1.10 |
| Fumed Silica Dispersion of Example 1 | 4.67 |
| Gassing Inhibitor[3] | 0.28 |
| TOTAL | 20.00 |

[1]Propylene glycol, commercially available from Arco Chemicals.
[2]Passivated aluminum flake pigment, commercially available from Toyo Aluminum K.K., represented by J. H. Hinz Company.
[3]A phosphatized epoxy polymer prepared from 42.51% VERSAMINE ® 551, commercially available from Henkel Corporation; 26.28% EPON ® 828, commercially available from Shell Chemical Company; 22.80% phosphorous acid; and 8.41% aqueous formaldehyde (37% active). The polymer is prepared at 55.10% polymer solids in a mixture of 70.18% DOWANOL PM, commercially available from Dow Chemical Company; 16.68% deionized water; 11.34% dimethylethanolamine; and 1.80% methanol. See U.S. Pat. No. 5,034,556.

The hexyl CELLOSOLVE and the DOWANOL DPM were added to an unlined stainless steel can. The aluminum paste 8160N-A was added under medium high agitation, which continued until the pigment was well dispersed. The remaining ingredients were added in order under slow agitation. After the additions were made, agitation continued for 15 minutes at medium speed to ensure complete dispersion of all components.

The pigment dispersion described above was evaluated for anti-settling properties after it had been aged at 140° F. for one month in an unlined stainless steel can. Results are shown in Table I, below.

The pigment dispersion described above was also used to prepare two coating compositions. One coating composition was made using the pigment dispersion after it was freshly prepared, and another was made using the pigment dispersion after it had been aged at 140° F. for one month in an unlined stainless steel can.

Each coating composition was prepared immediately before application by adding the appropriate pigment dispersion to the aqueous polymeric intermediate package of Example A in a ratio of 1:8 parts by weight. The mixtures were then stirred with a spatula until they were homogeneous.

Each coating composition was reduced with deionized water to a sprayable viscosity of about 200 centipoise, as measured with a Brookfield viscometer at about 72° F. using a #3 spindle at 60 RPM, and spray-applied to cold roll steel panels. Before the coating compositions were applied, the steel panels were scuff-sanded with No. 400 grit sandpaper then sealed with DP-40/401 Primer, a two-component epoxy primer commercially available from PPG Industries, Incorporated, which had been reduced to 50% by volume with DT-870 Thinner, also commercially available from PPG Industries, Incorporated.

After the coating compositions were applied, the panels were allowed to "flash" for 20 minutes at ambient temperature. Then, DCU-2020, a two-component hydroxy-isocyanate clearcoat commercially available from PPG Industries, Incorporated, was spray-applied wet-on-wet over the coating compositions of the present invention.

After the clearcoat was applied, the panels were allowed to dry at ambient temperature. The appearance and the physical properties of the films were evaluated after 24 hours, and again after 7 days. Results are shown in Table II, below.

EXAMPLE 2

Preparation of a Pigment Dispersion and a Coating Composition Using the Pigment Dispersing Additives of the Present Invention A pigment dispersion and a coating composition were prepared using pigment dispersing additives prepared in accordance with the present invention.

First, the pigment dispersing additive of Example I was used to prepare a pigment dispersion using the following ingredients.

| INGREDIENT | WEIGHT IN GRAMS |
|---|---|
| Hexyl CELLOSOLVE | 3.93 |
| PROPASOL P | 5.00 |
| Pigment Dispersing Additive | 2.00 |
| of Example I | |
| ARCOL PPG-425 | 1.59 |
| Aluminum Paste PA-60-513[1] | 6.57 |
| Gassing Inhibitor of Example 1 | 0.40 |
| TOTAL | 19.99 |

[1]Passivated aluminum flake pigment, commercially available from Toyo Aluminum K.K., represented by J. H. Hinz Company.

The hexyl CELLOSOLVE and the PROPASOL P were added to an unlined stainless steel can. The aluminum paste PA-60-513 was added under medium high agitation, which continued until the pigment was well dispersed. The remaining ingredients were added in order under slow agitation. After the additions were made, agitation continued for 15 minutes at medium speed to ensure complete dispersion of all components.

The pigment dispersion described above was evaluated for anti-settling properties after it had been aged at 140° F. for one month in an unlined stainless steel can. Results are shown in Table I, below.

The pigment dispersion described above was also used to prepare two coating compositions. One coating composition was made using the pigment dispersion after it was freshly prepared, and another was made using the pigment dispersion after it had been aged at 140° F. for one month in an unlined stainless steel can.

Each coating composition was prepared immediately before application by adding the appropriate pigment dispersion to the aqueous polymeric intermediate package of Example B in a ratio of 1:5 parts by weight. The mixtures were then stirred with a spatula until they were homogeneous.

Each coating composition was reduced with deionized water to a sprayable viscosity of about 200 centipoise, as measured with a Brookfield viscometer at about 72° F. using a #3 spindle at 60 RPM, and spray-applied to cold roll steel panels. Before the coating compositions were applied, the steel panels were scuff-sanded with No. 400 grit sandpaper then sealed with DP-40/401 Primer, a two-component epoxy primer commercially available from PPG Industries, Incorporated, which had been reduced to 50% by volume with DT-870 Thinner, also commercially available from PPG Industries, Incorporated.

After the coating compositions were applied, the panels were allowed to "flash" for 20 minutes at ambient temperature. Then, DCU-2020, a two-component hydroxy-isocyanate clearcoat commercially available from PPG Industries, Incorporated, was spray-applied wet-on-wet over the coating compositions of the present invention.

After the clearcoat was applied, the panels were allowed to dry at ambient temperature. The appearance and the physical properties of the films were evaluated after 24 hours, and again after 7 days. Results are shown in Table II, below.

EXAMPLE 3 (COMPARATIVE)

Preparation of Pigment dispersions and Coating Compositions Without a Pigment Dispersing Additive As a comparative example, a pigment dispersion and a coating composition were prepared without a pigment dispersing additive. Instead, commercially available surfactants were used to wet and disperse the pigment.

First, a pigment dispersion was prepared using the following ingredients:

| INGREDIENT | WEIGHT IN GRAMS |
|---|---|
| Hexyl CELLOSOLVE | 3.93 |
| PROPASOL P | 5.50 |
| ARCOL PPG-425 | 1.59 |
| Aluminum Paste PA-60-513 | 6.57 |
| TRITON ® X100[1] | 0.82 |
| TRITON X45[2] | 0.82 |
| Gassing Inhibitor of Example 1 | 0.40 |
| TOTAL | 19.63 |

[1]A surfactant, commercially available from Rohm & Haas Company.
[2]A surfactant, commercially available from Rohm & Haas Company.

The hexyl CELLOSOLVE and the PROPASOL P were added to an unlined stainless steel can. The aluminum paste PA-60-513 was added under medium high agitation, which continued until the pigment was well dispersed. The remaining ingredients were added in order under slow agitation. After the additions were made, agitation continued for 15 minutes at medium speed to ensure complete dispersion of all components.

The pigment dispersion described above was evaluated for anti-settling properties after it had been aged at 140° F. for one month in unlined stainless steel cans. Results are shown in Table I, below.

The pigment dispersion described above was also used to prepare two coating compositions. One coating composition was made using the pigment dispersion described above after it was freshly made, and another was made using the pigment dispersion after it had been aged at 140° F. for one month in an unlined stainless steel can.

Each coating composition was prepared immediately before application by adding the appropriate pigment dispersion to the aqueous polymeric intermediate package of Example B in a ratio of 1:5 parts by weight. The mixtures were then stirred with a spatula until they were homogeneous.

Each coating composition was reduced with deionized water to a sprayable viscosity of about 200 centipoise, as measured with a Brookfield viscometer at about 72° F. using a #3 spindle at 60 RPM, and spray-applied to cold roll steel panels. Before the coating compositions were applied, the steel panels were scuff-sanded with No. 400 grit sandpaper then sealed with DP-40/401 Primer, a two-component epoxy primer commercially available from PPG Industries, Incorporated, which had been reduced to 50% by volume with DT-870 Thinner, also commercially available frown PPG Industries, Incorporated.

After the coating compositions were applied, the panels were allowed to "flash" for 20 minutes at ambient temperature. Then, DCU-2020, a two-component hydroxy-isocyanate clearcoat commercially available from PPG Industries, Incorporated, was spray-applied wet-on-wet over the coating compositions of the present invention.

After the clearcoat was applied, the panels were allowed to dry at ambient temperature. The appearance of the films was evaluated after 24 hours, and again after 168 hours. Results are shown in Table II, below.

TABLE I

Anti-settling Properties of Various Pigment Dispersion After Heat-Aging

The pigment dispersions of Examples 1–3 were evaluated for their anti-settling properties. A spatula was inserted into a sample of each dispersion just after it was freshly prepared to determine the degree of settling that occurred. Then, each sample was aged at 140° F. for one month in sealed, unlined stainless steel cans. After this period, the each sample was cooled to room temperature, and re-evaluated for its anti-settling properties according to the test described above. Finally, each sample was agitated using a can shaker for ten minutes, and re-evaluated for its anti-settling properties according to the test described above. A 60 gram sample size was used for the pigment dispersion of Example 1, and a 150 gram sample size was used for the pigment dispersions of Examples 2 and 3.

ANTI-SETTLING PROPERTIES OF VARIOUS PIGMENT DISPERSIONS

| Example | Freshly Prepared | Heat-Aged One Month | Aged and Agitated |
|---|---|---|---|
| 1 | Homogeneous Well-Dispersed | Slight Soft Settle Appeared Dispersed | Homogeneous Well-Dispersed |
| 2 | Homogeneous Well-Dispersed | Slight Soft Settle Appeared Dispersed | Homogeneous Well-Dispersed |
| 3 | Homogeneous Well-Dispersed | Hard Settle Not Dispersed | Hard Settle Not Dispersed |

TABLE II

Film Appearance of Coating Compositions from Examples 1–3

The coated steel panels produced in Examples 1–3 were evaluated for appearance. Results are shown below.

FILM APPEARANCE PRODUCED BY THE COATING COMPOSITIONS OF EXAMPLES 1–6

| PROPERTY | | 20° GLOSS[1] | DOI[2] | METALLIC APPEARANCE |
|---|---|---|---|---|
| COATING COMPOSITION OF EXAMPLE 1A[3] | 24 HOURS 168 HOURS | 92 90 | 90 90 | Bright Bright |
| COATING COMPOSITION OF EXAMPLE 2A[3] | 24 HOURS 168 HOURS | 97 94 | 90 90 | Bright Bright |
| COATING COMPOSITION OF EXAMPLE 3A[3] | 24 HOURS 168 HOURS | 96 95 | 90 90 | Bright Bright |
| COATING COMPOSITION OF EXAMPLE 1B[4] | 24 HOURS 168 HOURS | 91 91 | 90 90 | Bright Bright |
| COATING COMPOSITION OF EXAMPLE 2B[4] | 24 HOURS 168 HOURS | 97 95 | 90 90 | Bright Bright |

TABLE II-continued

| COATING COMPOSITION OF EXAMPLE 3B[4,5] | 24 HOURS 168 HOURS | N/A N/A | NA N/A | N/A N/A |
|---|---|---|---|---|

[1]Gloss was measured at 24 hours and 168 hours after application using a Hunter gloss meter, commercially available from Hunter Laboratories.
[2]Distinctness of image was measured at 24 hours and 168 hours after application using a Dorigon Meter D-47-6, commercially available from Hunter Laboratories.
[3]Coating compositions 1A–3A were made using freshly prepared pigment dispersions.
[4]Coating compositions 1B–3B were made using pigment dispersions that had been aged at 140° F. for one month in sealed, unlined stainless steel cans
[5]The pigment dispersion of Example 3 was not used to prepare a coating composition after it had been heat-aged because it exhibited severe hard settling, and the pigment could not be redispersed with normal agitation.

We claim:

1. A copolymer comprising alternating units of a vinyl monomer and a diester of a dicarboxylic acid in which at least one of the esterifying groups comprises a polyether group; said copolymer having an acid value of less than one.

2. The copolymer of claim 1 wherein the copolymer further comprises units of a diester of a dicarboxylic acid in which the esterifying groups are organic groups free of polyether groups.

3. The copolymer of claim 1 having a number-average molecular weight of from about 1,000 to about 100,000.

4. The copolymer of claim 3 having a number-average molecular weight of from about 20,000 to about 50,000.

5. The copolymer of claim 4 having a number-average molecular weight of from about 25,000 to about 40,000.

6. The copolymer of claim 1 wherein the acid value is essentially zero.

7. The copolymer of claim 1 wherein the vinyl monomer is selected from the group consisting of vinyl aromatic compounds; substituted vinyl aromatic compounds; vinyl ethers; allyl compounds; alpha olefins; dienes; and mixtures thereof.

8. The copolymer of claim 1 wherein the diester of a dicarboxylic acid is selected from the group consisting of diesters of aliphatic dicarboxylic acids; diesters of cycloaliphatic dicarboxylic acids; diesters of aromatic dicarboxylic acids; and mixtures thereof.

9. The copolymer of claim 8 wherein the diester is a diester of an aliphatic dicarboxylic acid.

10. The copolymer of claim 9 wherein the diester of a dicarboxylic acid is a diester of maleic acid.

11. The copolymer of claim 10 wherein the polyether esterifying groups are contributed by a polyethylene glycol having the following structural formula:

$$R-O-(CH_2CH_2O)_nCH_2CH_2OH$$

wherein n is an integer from 1 to 20; and R is an alkyl, cycloaliphatic, or aryl group containing from 1 to 20 carbon atoms.

12. The copolymer of claim 11 wherein R is an alkyl group which is a methyl group.

13. The copolymer of claim 11 wherein the polyethylene glycol has a number-average molecular weight of from about 100 to about 3,000.

14. The copolymer of claim 13 wherein the polyethylene glycol has a number-average molecular weight of from about 700 to about 1000.

15. The copolymer of claim 14 wherein the polyethylene glycol has a number average molecular weight of from about 700 to about 800.

16. A pigment dispersion comprising:
   A. a pigment component; and
   B. a copolymer comprising alternating units of a vinyl monomer and a diester of a dicarboxylic acid in which at least one of the esterifying groups comprises a polyether group; said copolymer having an acid value of less than one.

17. The composition of claim 16 wherein the pigment component comprises a metallic or metallic-effect pigment.

18. The composition of claim 17 wherein the metallic pigment is aluminum flake.

19. The composition of claim 16 further comprising a diluent.

20. The composition of claim 19 wherein the diluent is a water-reducible organic solvent.

21. The composition of claim 20 wherein the organic solvent comprises a glycol ether solvent or a mixture of glycol ether solvents.

22. The composition of claim 16 wherein the copolymer is present at a level of from about 0.1 percent by weight to about 100 percent by weight, based on the weight of pigment in the dispersion.

23. The composition of claim 22 wherein the copolymer is present at a level of from about 1 percent by weight to about 50 percent by weight, based on the weight of pigment in the dispersion.

24. The composition of claim 23 wherein the copolymer is present at a level of from about 2 percent by weight to about 15 percent by weight, based on the weight of pigment in the dispersion.

25. The composition of claim 16 further comprising an auxiliary polymer.

26. The composition of claim 25 wherein the auxiliary polymer is a polyester polymer.

27. The composition of claim 25 wherein the auxiliary polymer is propylene glycol.

28. A coating composition comprising:
   A. a film-forming polymer;
   B. a pigment dispersion comprising:
      1) a pigment component; and
      2) a copolymer comprising alternating units of a vinyl monomer and a diester of a dicarboxylic acid in which at least one of the esterifying groups comprises a polyether group; said copolymer having an acid value of less than one.

29. The composition of claim 28 wherein the pigment dispersion further comprises a diluent.

30. The composition of claim 29 wherein the diluent is a mixture of water and water-reducible organic solvents.

31. The composition of claim 28 wherein the film-forming polymer is a water-dispersible polymer.

32. The composition of claim 31 wherein the film-forming polymer is a water-dispersible acrylic latex polymer.

33. The composition of claim 30 wherein the coating composition is a multi-package system.

34. The composition of claim 33 wherein the multi-package system includes a reducer package comprising deionized water, water-reducible organic solvents, surfactants, inorganic or organic acids or bases, flow control agents, and mixtures thereof.

35. The composition of claim 28 wherein the pigment component contains a metallic or metallic-effect pigment.

36. The composition of claim 35 wherein the pigment component contains aluminum flake.

37. The composition of claim 28 wherein the copolymer is present at a level of from about 2 percent to about 15 percent based on the weight of the pigment in the dispersion.

38. The composition of claim 28 wherein the pigment is present at a level of from about 2 percent to about 60 percent by weight, based on the weight of the pigment plus the weight of the film-forming polymer.

* * * * *